US012437089B2

(12) United States Patent
Nikoghossian et al.

(10) Patent No.: US 12,437,089 B2
(45) Date of Patent: Oct. 7, 2025

(54) ON-DEMAND REAL-TIME TOKENIZATION SYSTEMS AND METHODS

(71) Applicant: The Toronto-Dominion Bank, Toronto (CA)

(72) Inventors: Méliné Nikoghossian, Toronto (CA); Wojciech Chowanski, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 246 days.

(21) Appl. No.: 17/726,583

(22) Filed: Apr. 22, 2022

(65) Prior Publication Data
US 2023/0342481 A1    Oct. 26, 2023

(51) Int. Cl.
*G06F 21/62*    (2013.01)
(52) U.S. Cl.
CPC .................................. *G06F 21/62* (2013.01)
(58) Field of Classification Search
None
See application file for complete search history.

(56) References Cited

U.S. PATENT DOCUMENTS

| | | | |
|---|---|---|---|
| 8,458,487 B1 | 6/2013 | Palgon et al. | |
| 9,419,841 B1 | 8/2016 | Kozolchyk et al. | |
| 9,958,494 B2 | 5/2018 | Hou et al. | |
| 10,304,047 B2 | 5/2019 | Huxham et al. | |
| 10,878,126 B1* | 12/2020 | Koduru | G06F 16/211 |
| 10,956,591 B1* | 3/2021 | Joshi | G06F 21/602 |
| 11,405,189 B1* | 8/2022 | Bennison | H04L 9/0656 |
| 11,487,442 B1* | 11/2022 | Bhat | G06F 3/0661 |
| 11,921,891 B2* | 3/2024 | Hatcher | H04L 9/0643 |
| 2003/0167207 A1* | 9/2003 | Berardi | G06Q 20/00 705/16 |
| 2012/0114119 A1* | 5/2012 | Ahuja | H04L 63/1416 726/20 |
| 2021/0256150 A1 | 8/2021 | Bayon et al. | |

* cited by examiner

*Primary Examiner* — Scott B Christensen
(74) *Attorney, Agent, or Firm* — Marks & Clerk

(57) ABSTRACT

Systems and methods for on-demand tokenization of data. Sensitive data elements are tokenized according to a standardized approach, with the resulting token being, or incorporating, a universally unique identifier (UUID). Each payload-token mapping is stored in a distributed key-value database, with the input payload serving as the basis for the key and the generated token stored as the value. The distributed key-value database is accessible to systems within a trusted environment, and also to authorized external applications via a tokenization API service, allowing a variety of applications to request tokenization in real-time, and their data sets to be cross-correlatable.

20 Claims, 8 Drawing Sheets

ON-DEMAND REAL-TIME TOKENIZATION SYSTEMS AND METHODS

TECHNICAL FIELD

The disclosed exemplary embodiments relate to computer-implemented systems and methods for processing confidential data.

BACKGROUND

Within a computing environment, there may exist databases or data stores that contain sensitive information (e.g., personally identifiable information or "PII") that is required to be kept confidential. Often, it is not the entire record that is sensitive, but merely an element of the record. For example, an identifier number may be considered sensitive, while an identifier type may not.

In many cases, it may be desirable to use the data in the data store, or portions thereof, for additional purposes, or to reveal portions of the data to certain individuals or entities. For instance, the data may be used to train or test machine learning models. In such cases, to protect any sensitive information in the data, obfuscation or masking can be employed to conceal or remove the sensitive information, such that it cannot be identified in the data to be used.

SUMMARY

The following summary is intended to introduce the reader to various aspects of the detailed description, but not to define or delimit any invention.

In at least one broad aspect, there is provided a system for tokenizing data, the system comprising: a key-value database configured to store a mapping; a computer operatively coupled to the key-value database, the computer comprising a memory and a processor configured to: obtain a payload to be tokenized; process the payload to generate a key; conduct a search within the key-value database for a value corresponding to the key; returning the value as the token when the search is successful and otherwise: generate a new value based on the payload, the new value generated based on a universally unique identifier; append an entry to the key-value database, where the entry comprises the key and the new value; and return the new value as the token.

In some cases, the computer includes a batch processing computer.

In some cases, there is also provided a tokenization server that is operatively coupled to the key-value database, the tokenization server comprising a tokenization server memory and a tokenization server processor, the tokenization server processor configured to: receive a second tokenization request, the second tokenization request comprising a second payload to be tokenized; process the second payload to generate a second key, the second key identical to the key; conduct a search within the key-value database for the value corresponding to the key and the second key; and respond to the tokenization request with a tokenization response comprising the value as the token.

In some cases, the tokenization server provides an API service to receive the tokenization request.

In some cases, there is also provided a source database, the source database storing sensitive data including the payload.

In some cases, there is also provided: a tokenized database storing tokenized data, the tokenized data including the token; and a client computer operatively coupled to the tokenized database and restricted from accessing the source database, the client computer configured to generate a record request identifying the token, wherein the tokenization server is further configured to retrieve a record from the source database based on the record request, create a tokenized record in which the token is substituted for the payload, and provide the tokenized record to the client computer.

In some cases, the processor is further configured to identify a configuration file, and wherein the processing the payload is performed according to the configuration file.

In some cases, the processing the payload comprises trimming or normalizing the payload.

In some cases, there is also provided a training computer comprising a training computer memory and a training computer processor, wherein the training computer processor is configured to replace the payload in a machine learning training data set with the token, and train a predictive model using the machine learning training data set.

In some cases, there is also provided a prediction computer comprising a prediction computer memory and a prediction computer processor, wherein the prediction computer processor is configured to input the token to the predictive model to obtain a prediction.

In another broad aspect, there is provided a method of obtaining a token, the method comprising: obtaining a payload to be tokenized; processing the payload to generate a key; conducting a search within a key-value database for a value corresponding to the key; returning the value as the token when the search is successful and otherwise: generating a new value based on the payload, the new value generated based on a universally unique identifier; appending an entry to the key-value database, where the entry comprises the key and the new value; and returning the new value as the token.

In some cases, the method further comprises, prior to processing the payload to generate the key, identifying a configuration file, wherein the processing the payload is performed according to the configuration file.

In some cases, the method further comprises: a tokenization server receiving a tokenization request, the tokenization request comprising the payload to be tokenized, wherein the tokenization server is operatively coupled to the key-value database; and the tokenization server responding to the tokenization request with a tokenization response comprising the token.

In some cases, the tokenization server provides an API service to receive the tokenization request.

In some cases, the method is performed by a batch processing computer.

In some cases, the method further comprises: a tokenization server receiving a second tokenization request, the second tokenization request comprising a second payload to be tokenized, wherein the tokenization server is operatively coupled to the key-value database; the tokenization server processing the second payload to generate a second key, the second key identical to the key; the tokenization server conducting a search within the key-value database for the value corresponding to the key and the second key; and the tokenization server responding to the tokenization request with a tokenization response comprising the value as the token.

In some cases, the processing the payload comprises trimming or normalizing the payload.

In some cases, the payload is comprised within a machine learning training data set, further comprising replacing the payload in the machine learning training data set with the token and training a predictive model using the machine learning training data set.

In some cases, the method further comprises inputting the token to the predictive model to obtain a prediction.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1:
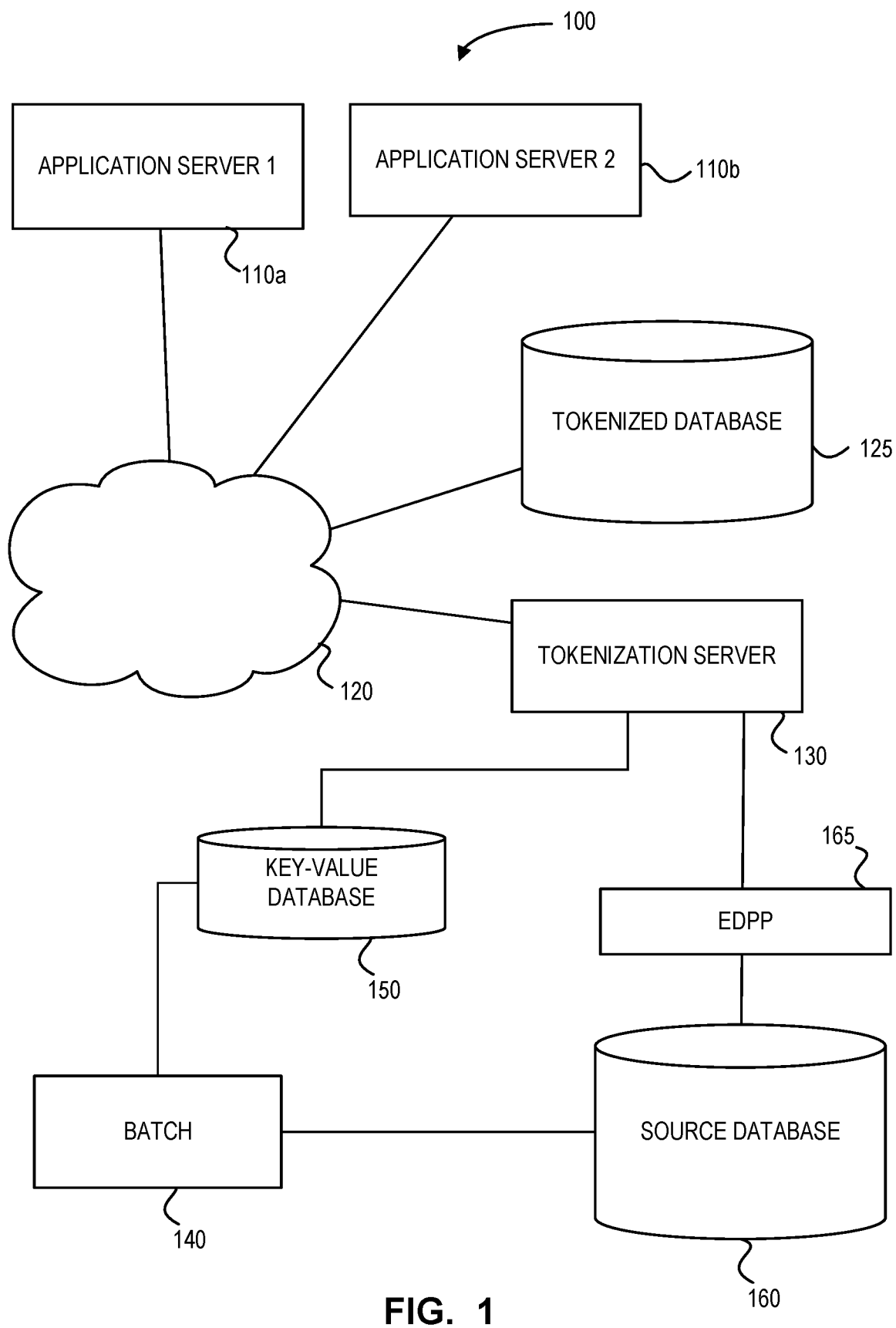
FIG. 1 is a schematic block diagram of a system for performing on-demand tokenization in accordance with at least some embodiments.

Many organizations possess and maintain confidential data regarding their operations. For instance, some organizations may have confidential data concerning industrial formulas and processes. Other organizations may have confidential data concerning customers and their interactions with those customers. In a large organization, this confidential data may be stored in a variety of databases, which may have different, sometimes incompatible schemas, fields and compositions. A sufficiently large organization may have hundreds of millions of records across these various databases, corresponding to tens of thousands, hundreds of thousands or even millions of customers. This quantity and scope of confidential data represents a highly desirable source of data to be used as input into machine learning models that can be trained, e.g., to predict future occurrences of events, such as customer interactions or non-interactions.

With such large volumes of data, it may be desirable to use the computational resources available in distributed or cloud-based computing systems. For instance, many distributed or cloud-based computing clusters provide parallelized, fault-tolerant distributed computing and analytical protocols (e.g., the Apache Spark™ distributed, cluster-computing framework, the Databricks™ analytical platform, etc.) that facilitate adaptive training of machine learning or artificial intelligence processes, and real-time application the adaptively trained machine learning processes or artificial intelligence processes to input datasets or input feature vectors. These processes can involve large numbers of massively parallelizable vector-matrix operations, and the distributed or cloud-based computing clusters often include graphics processing units (GPUs) capable of processing thousands of operations (e.g., vector operations) in a single clock cycle and/or tensor processing units (TPUs) capable of processing hundreds of thousands of operations (e.g., matrix operations) in a single clock cycle. Use of such distributed or cloud-based computing clusters can therefore accelerate the training and subsequent deployment of the machine-learning and artificial-intelligence processes, and may result in a higher throughput during training and subsequent deployment, when compared to the training and subsequent deployment of the machine-learning and artificial-intelligence processes across the existing computing systems of a particular organization.

However, in many cases, there may be confidentiality and privacy restrictions imposed on organizations by governmental, regulatory, or other entities. These privacy restrictions may prohibit the confidential data from being transmitted to computing systems that are not "on-premises" or within the exclusive control of an organization, for example, or that are shared among multiple organizations, as is common in a cloud-based environment. In particular, such privacy restrictions may prohibit the confidential data from being transmitted to distributed or cloud-based computing systems, where it can be processed by machine learning systems, without appropriate anonymization or obfuscation of PII in the confidential data. Moreover, such "on-premises" systems typically are designed with access controls to limit access to the data, and thus may not be resourced or otherwise suitable for use in broader dissemination of the data.

To comply with such restrictions, the computing systems of an organization may "de-risk" data tables that contain confidential data prior to transmission to such distributed or cloud-based computing systems. This de-risking process may, for example, obfuscate or mask elements of confidential data, or may exclude certain elements, depending on the specific restrictions applicable to the confidential data. The specific type of obfuscation, masking or other processing is referred to as a "data treatment."

Data treatments may include, e.g., anonymizing, masking, deleting, encrypting, hashing, or tokenizing sensitive data elements. Tokenization is one form of data treatment to avoid revealing sensitive information. Tokenization involves substituting a sensitive data element with a non-sensitive equivalent, i.e., a token. A mapping between the token and the sensitive data element can be maintained in a separate table to enable de-tokenization at a later time. Some data treatments may attempt to preserve a structure or format of the underlying data (e.g., a credit card number may be tokenized in such a fashion that the tokenized card number still observes credit card number validation rules). Tokenization may be performed according to pre-specified rules, which may be stored in a configuration file.

Tokenization of sensitive data is often desirable but different applications, on different systems, may perform tokenization differently. When tokens are generated according to different rules, the resulting tokens are not likely to be correlatable across data sets, even though they may represent the same underlying data elements. For instance, if an identifier number (e.g., a user identifier) in a first table is tokenized to produce a first token according to a first configuration file applicable to the first table, and the same identifier number in a second table is tokenized according to a second, different configuration file applicable to the second table, the resulting second token is likely to differ from the first token thus preventing correlation (e.g., a "join" operation on multiple tables of tokenized data). The difficulty is only amplified when different systems attempt to access tokenized data created according to their own configuration rules, or if configuration rules are created at different times or for different purposes.

Using conventional approaches, when data is requested to be tokenized, it may be difficult to identify whether the same data has been previously tokenized, and the tokenization scheme that was used previously. Even when the previous tokenization scheme can be identified that scheme may not be suitable for use in a different context. This leads to the above-identified problem of making it difficult or impossible to correlate data generated using different rules.

A further problem with tokenization arises when tokenized data is used to train machine learning systems. When the model is trained using tokenized data, it may perform sub-optimally, or not at all, when generating predictions based on non-tokenized data.

The described systems and methods provide for performing on-demand tokenization of data according to a standardized configuration, applicable across a variety of computing systems and approaches. In particular, input payloads are tokenized according to a standardized approach that operates both offline and online in real-time, and the resulting tokens are, or incorporate, a universally unique identifier (UUID), such that any given sensitive data element is only tokenized once. The process of generating a UUID generally is not reproducible, therefore each payload-token mapping is stored in a distributed key-value store, with the input payload serving as the basis for the key—either directly or after pre-processing—and the generated token stored as the value. To avoid generating duplicate tokens for the same payload, the payload is checked against the distributed key-value store before generating a new token, to determine whether a corresponding token has been previously created. Some computer systems may have direct access to the distributed key-value store. Other computer systems may achieve access to the distributed key-value store via a tokenization application programming interface (API) service, allowing a variety of applications to request tokenization or tokenized data in real-time, while retaining cross-correlatibility between data sets.

Furthermore, in the machine learning context, the described embodiments allow for inputs to machine learning models to be tokenized, and predictions output from those models detokenized, quickly or in real-time.

Referring now to FIG. 1, there is illustrated a schematic block diagram of a system for performing on-demand tokenization in accordance with at least some embodiments.

System 100 is an example enterprise computing environment, that has a mix of non-interactive (e.g., batch processing) systems and interactive (e.g., real-time processing) systems. Batch processing systems generally are designed and optimized to run a large volume of operations at once, and are typically used to perform high-volume, repetitive tasks that do not require real-time interactive input or output. Conversely, interactive systems may accept input (e.g., commands and data) and produce output in real-time. In contrast to batch processing systems, interactive systems generally are designed and optimized to perform small, discrete tasks as quickly as possible, although in some cases they may also be tasked with performing long-running computations similar to batch processing tasks.

The nature of batch processing systems may require data stores to be locked while batch processing is taking place. For instance, a batch computer may lock one million records in a database, such as source database 160, for updating. That updating may take on the order of minutes, hours or even longer in some instances. If another system requests access to the same records while this batch processing is taking place, it may be denied or limited to read-only access until the batch processing is complete and the records are unlocked. This is to prevent concurrent access by other systems from introducing inconsistencies into the data. Accordingly, lengthy batch jobs are generally scheduled for times at which demand for source database 160 is lowest (e.g., nights or weekends).

System 100 has one or more application servers 110 (for ease of illustration only application server 110a and 110b are shown), a tokenized database 125, a tokenization server 130, a batch computer 140, a source database 160, an enterprise data provisioning platform (EDPP) 165, a key-value database 150 and a network 120.

Application servers 110 and tokenization server 130 are computer servers that may be standalone computers, or nodes in a distributed or cloud-based computing system. Accordingly, application servers 110 and tokenization server 130 are operatively coupled via network 120, which is a data communications network. Network 120 may include portions of public networks such as the Internet, other public or private networks, cloud systems, and/or other suitable data communication links.

Application servers 110 can be configured to execute various tasks. For example, some application servers 110 may be web servers, other application servers 110 may form nodes in a distributed machine learning system, and so forth.

Tokenized database 125 may be provided by a database server, or servers, also operatively coupled via network 120. In some cases, tokenized database 125 is implemented in a conventional relational database management system (RDBMS) while in other cases it is a non-relational database, depending on the specific data being stored. Tokenized database 125 may be implemented as a standalone database or as a distributed data repository, sometimes referred to as a data warehouse or data lake. In a distributed data repository, data generally is distributed over many nodes, such as in the Hadoop Distributed File System™ (HDFS).

Batch computer 140 is a computer server that generally is designed for batch processing operations that execute with minimal human interaction. Batch computer 140 is operatively coupled to a key-value database 150 and source database 160. In some cases, key-value database 150, source database 160, or both, may be hosted by batch computer 140.

Source database 160 generally stores data that may include sensitive data, such as PII and other confidential information. As with tokenized database 125, source database 160 may be implemented as a RDBMS, or as a non-relational database, or both. Regardless, source database 160 may be a standalone system or a distributed data repository or data lake. In some cases, an EDPP 165 may be provided to manage import and export of data to and from source database 160. EDPP 165 may be configured to perform extract, transform and load operations. In some other cases, EDPP 165 may be bypassed or not present.

Both batch computer 140 and tokenization server 130 are operatively coupled to key-value database 150. Key-value database 150 is a key-value store that may be implemented as a standalone database or as a distributed database, in which data is distributed over many nodes, such as in HDFS. In some examples, the key-value database 150 is implemented as a distributed, scalable, non-relational (NoSQL) big data store, such as Apache HBase™, running on HDFS.

Figure 2:
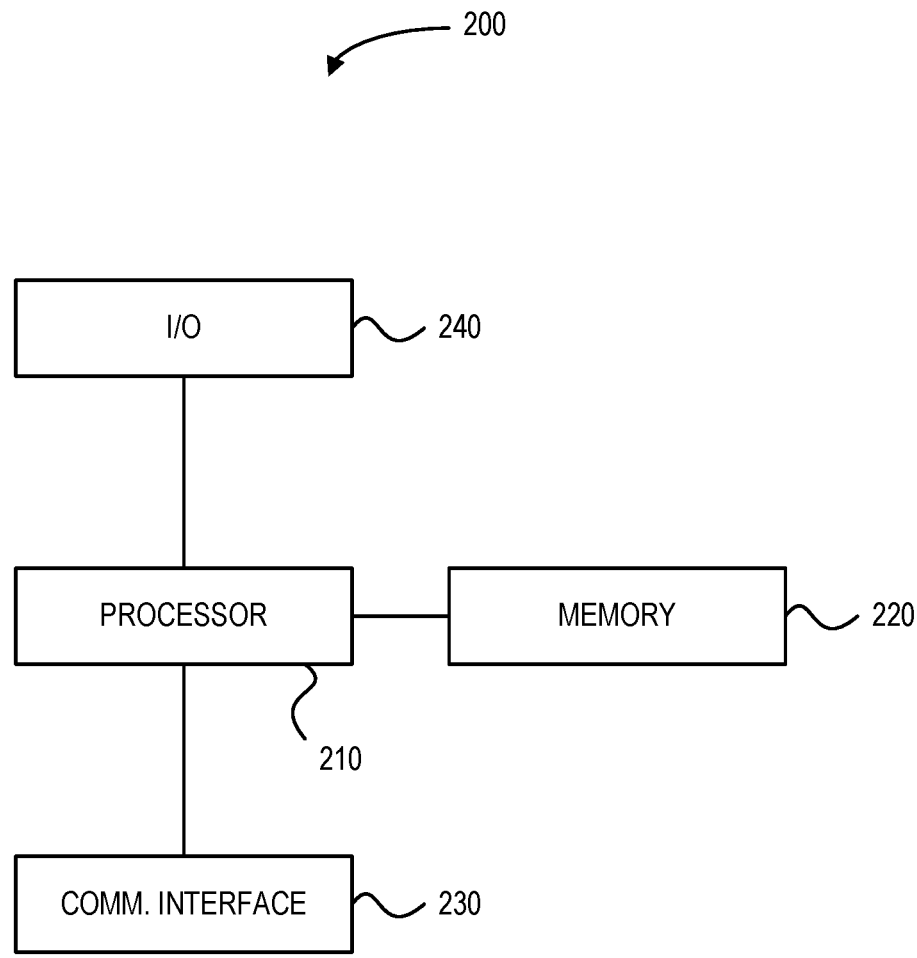
FIG. 2 is a simplified block diagram of a computer in accordance with at least some embodiments.

Referring now to FIG. 2, there is illustrated a simplified block diagram of a computer in accordance with at least some embodiments. Computer 200 is a generic example of a computer, such as an application server 110, tokenization server 130 and/or batch computer 140 of FIG. 1. Computer 200 generally has at least one processor 210 operatively coupled to at least one memory 220, at least one communications interface 230, and at least one additional input/output device 240.

The at least one memory 220 includes a volatile memory that stores instructions executed or executable by processor 210, and input and output data used or generated during execution of the instructions. Memory 220 may also include non-volatile memory used to store input and/or output data along with program code containing executable instructions.

Processor 210 may transmit or receive data via communications interface 230, and may also transmit or receive data via any additional input/output device 240 as appropriate.

Depending on role, a first computer 200 may be configured differently than a second computer 200. For example, a computer 200 that implements an application server 110 may be a Linux-based or Microsoft Windows™-based computer server, whereas another computer 200 that implements a batch computer 140 may be an IBM Z™ computer system.

Figure 3:
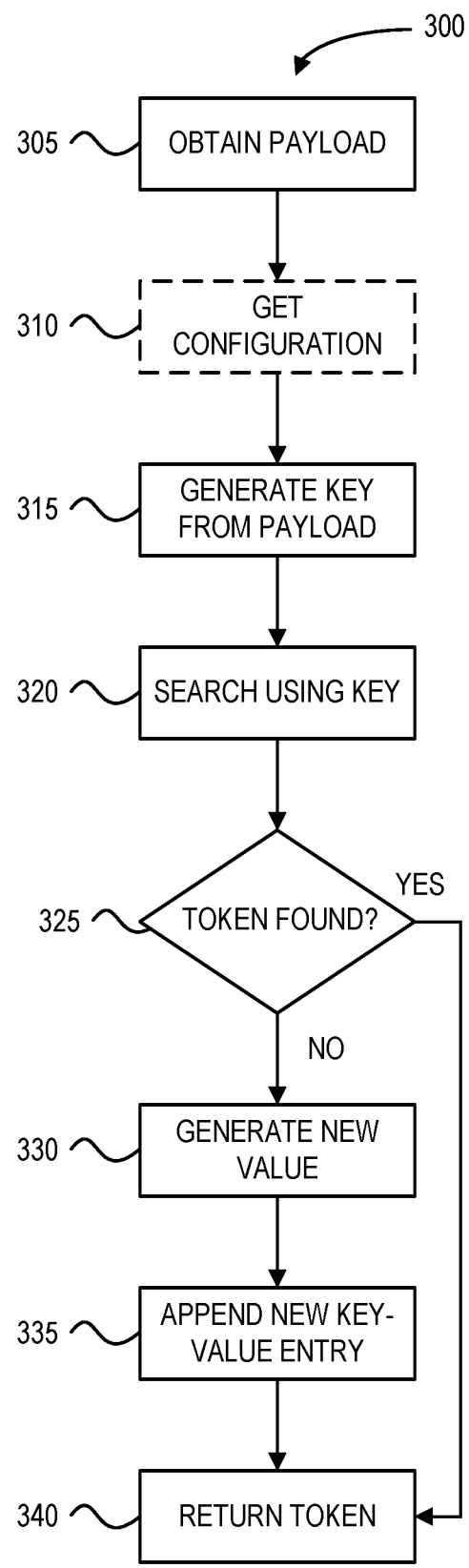
FIG. 3 is a flowchart diagram of an example method of obtaining a token in accordance with at least some embodiments.

Referring now to FIG. 3, there is illustrated a flowchart diagram of an example method of obtaining a token in accordance with at least some embodiments. Method 300 may be carried out, e.g., by a processor of a tokenization server 130 or batch computer 140 of FIG. 1.

Method 300 optionally begins at 305 with the processor obtaining or receiving a payload to be tokenized. The payload may be, for example, a sensitive data element (e.g., from a source database such as source database 160) that is PII or any other data element that is desirable to mask or obfuscate in a data set. In some cases, metadata regarding the payload may also be obtained. Metadata may include, for example, a payload type of the payload (e.g., telephone number, address, postal code, driver's license number, government identification number, credit card number, etc.).

Optionally, at 310, the processor may retrieve a configuration that specifies a tokenization scheme applicable to the payload. The configuration may be provided in a configuration file. Different configuration files may be provided for varying types of payloads. For example, there may be one configuration file for names, another for postal code data, another for identifier numbers, yet another configuration file for dates, and so forth. The configuration files generally will specify any preprocessing of payloads that is to be performed, and the rules for generating tokens.

In some cases, such as when the processor is configured to apply only a single tokenization scheme, this action may be omitted.

In other cases, where a variety of types of data are being tokenized, the action of retrieving the configuration may be based on a data type identified along with the payload when the payload is received. For example, a sensitive data element such as a postal code may be tokenized according to a postal code tokenization scheme, whereas a telephone number make be tokenized according to a telephone number tokenization scheme.

At 315, the payload is processed to generate a key. In some cases, the key may be identical to the payload. However, in other cases, the payload may be normalized, trimmed, truncated or otherwise pre-processed according to pre-processing rules to obtain the key in a consistent or uniform fashion. For example, a telephone number may be normalized to a standard format (e.g., (555) 555-1234 may be normalized to +15555551234), alphabetic characters may be normalized to uppercase, addresses may be normalized by performing a lookup within a postal database, a rule may specify that only a portion of the payload is to be used, etc. In some cases, the payload may also be input to a hash function, with the output becoming the key.

Certain types of payloads may also be manipulated, such as by constraining precision of numerical values by rounding to a predetermined number of places. For example, a numerical value of 102.23 may be rounded to 102 to eliminate decimal places. Similarly, larger values may be rounded to the nearest hundred or thousand. In some cases, a predetermined number of significant digits is used.

At 320, the key is used to query within a key-value database, such as key-value database 150, for a corresponding value.

At 325, the processor determines whether a value corresponding to the key was found in the key-value database. If a value was successfully found, the processor proceeds to 340 and returns the value as the token corresponding to the payload.

If a value corresponding to the key was not found, then the processor proceeds to 330 to generate a new value corresponding to the key.

The new value may be generated using a function that outputs a UUID, sometimes called a globally unique identifier (GUID). UUIDs are numbers that can be generated to be pseudorandom according to a standardized approach, such as that defined in IETF RFC 4122, ITU-T Rec. X.667 or ISO/IEC 9834-8:2005. In some embodiments, the UUIDs may be generated to retain similar characteristics to the original payload. For example, a telephone number token UUID may retain a similar number of characters as telephone numbers, a credit card number token UUID may retain a similar number of characters as credit cards, and so forth.

The process of generating a UUID generally is not reproducible, therefore, once generated, the new value is stored along with the key in the key-value database at 335. Generally, new key-value entries are appended in the key-value database. In this way, the payload-to-token mapping is maintained. Since the key is used to search for a corresponding value before a new value is generated, each payload need not be generated more than once.

The new value and its corresponding key are appended to the key-value database at 335.

Following generation of a new value, or if the token was found at 325, then the processor may return the value as the token at 340 to the requesting entity that initiated the process at 305.

Method 300 is self-contained and does not require access to any extrinsic data other than the payload and the key-value database. In particular, method 300 can be performed without reference to the database (e.g., source database) from which the payload itself originates.

Figure 4:
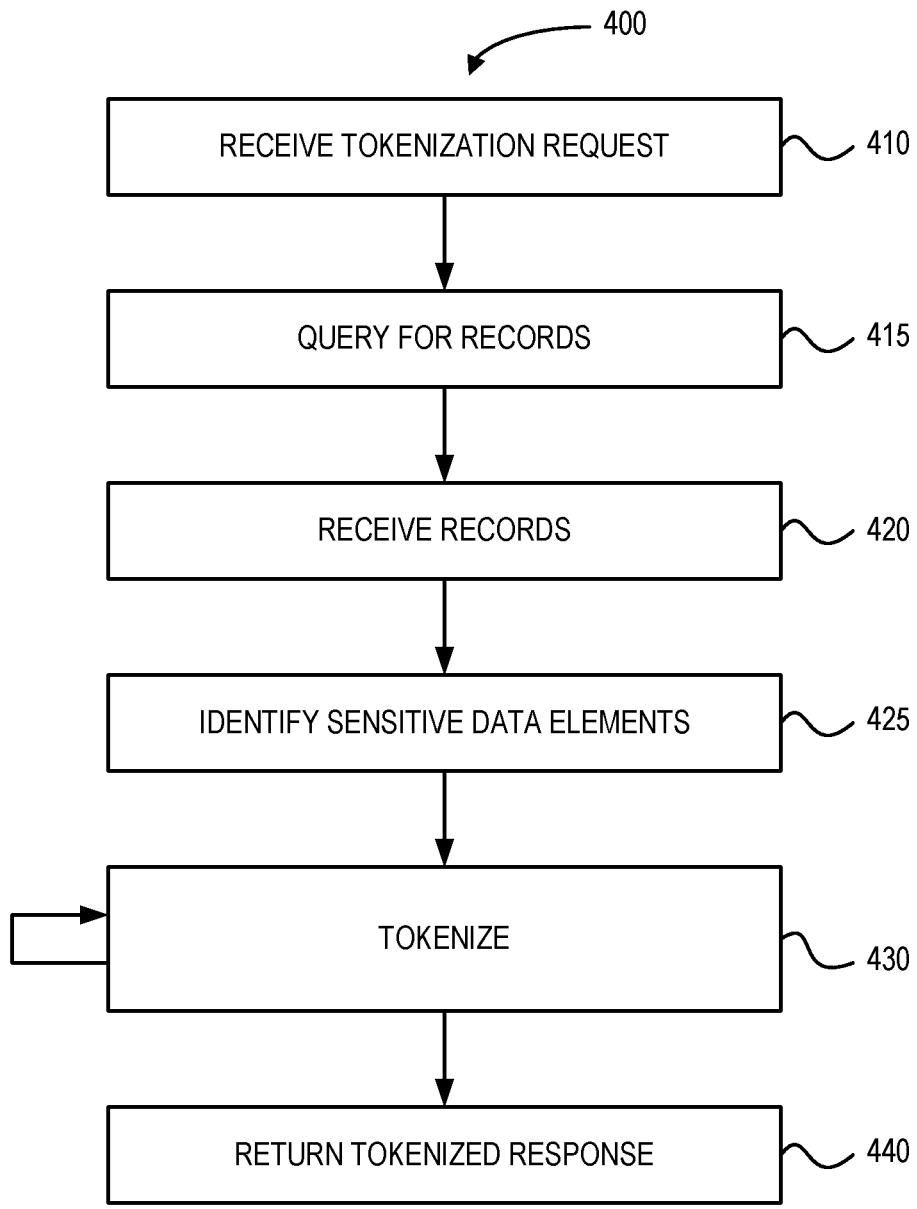
FIG. 4 is a flowchart diagram of an example method of providing tokenized data in accordance with at least some embodiments.

Referring now to FIG. 4, there is illustrated a flowchart diagram of an example method of providing tokenized data in accordance with at least some embodiments. Method 400 may be carried out, for example, by a tokenization server such as tokenization server 130 of FIG. 1.

In some embodiments, the described tokenization server may serve as an API endpoint, and provide a tokenization service to one or more application servers. The tokenization server may be, e.g., a web server, such as an Apache Tomcat servlet, configured to respond to API requests received using the Hypertext Transfer Protocol (HTTP) or Hypertext Transfer Protocol Secure (HTTPS).

Method 400 begins at 410, with the tokenization server receiving an HTTP or HTTPS request that forms a tokenized record request.

In some embodiments, the tokenized record request contains an identification of a record or records to be retrieved from a source database, such as source database 160. The tokenized record request may, in some cases, contain authentication credentials for accessing the record or records.

At 415, the tokenization server identifies the records to be retrieved from the source database and queries the source database for the records. If required, authentication credentials for access to the records may be verified. The authentication credentials may, in some cases, be used to determine which sensitive data elements in the records should be tokenized.

At 420, the tokenization server receives the records in response to the query.

At 425, the tokenization server identifies or determines whether there are any sensitive data elements within the records.

At 430, for each sensitive data element in the records, the tokenization server performs method 300 of FIG. 3 to obtain a token corresponding to the respective sensitive data element and to substitute the token in the tokenized records to be provided.

At 440, the processor formulates an HTTP or HTTPS response containing the request tokenized records and transmits the response to the source of the HTTP or HTTPS request.

Due to the streamlined nature of method 300, which not require extrinsic data access, the tokenization server is capable of operating with high throughput and response time, thereby facilitating real-time and on-demand export of data sets from a source database. This enables application servers to make high volumes of requests.

In some cases, tokenized records may also be stored in a tokenized database, such as tokenized database 125, for future access.

The described systems and methods provide for a single tokenization scheme that is re-usable across a variety of use cases. In some cases, the key-value database may be accessible to both a batch processing system and an interactive system, allowing the batch processing system to carry out tokenization according to a common configuration during batch processing operations. Since the described embodiments generally only produce a payload-token (i.e., key-value) mapping once for any given payload, this allows for batch processing to take place while a tokenization API service retains access to the key-value database, and thus remains fully accessible to interactive systems.

Figure 5:
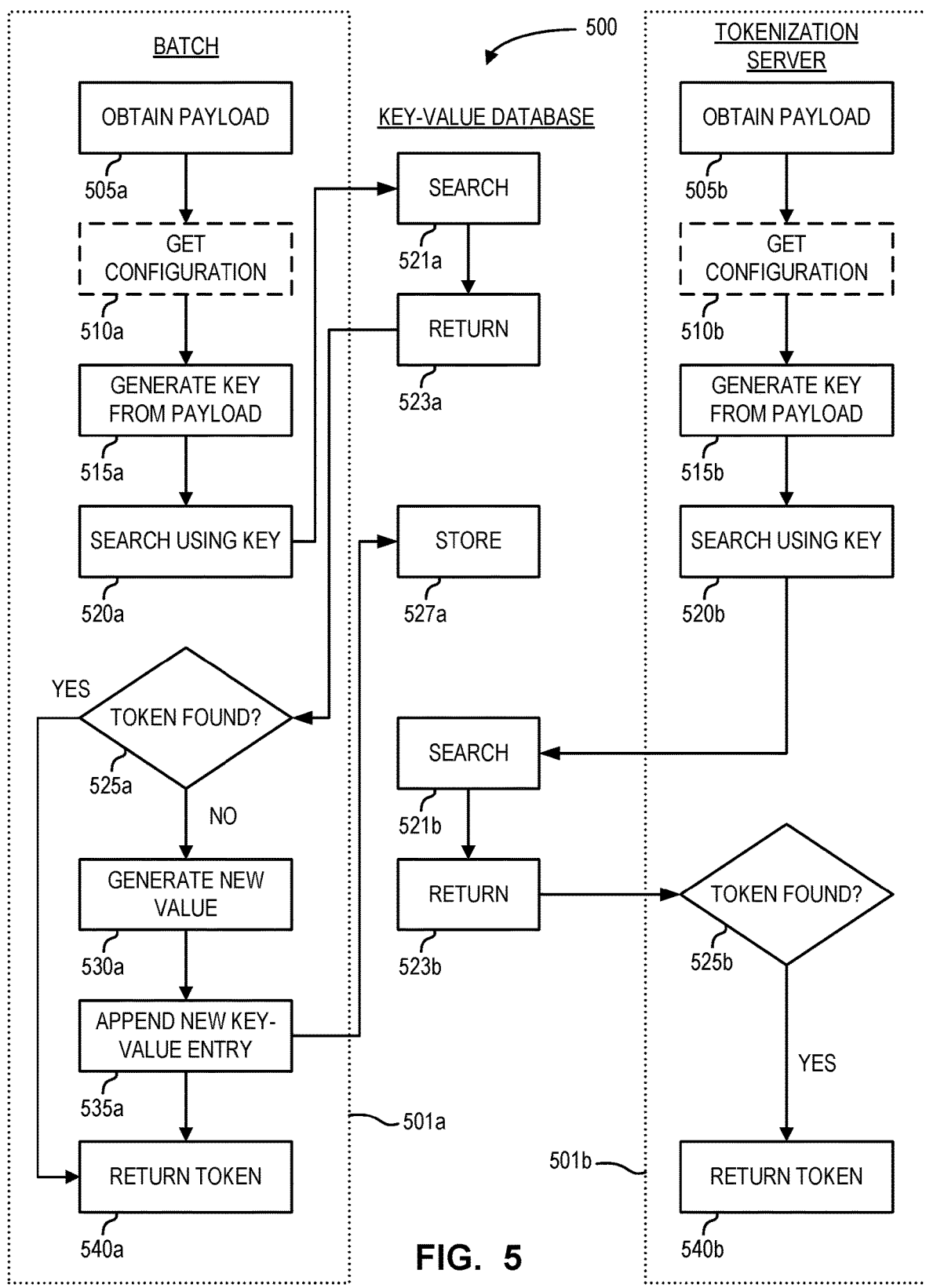
FIG. 5 is a flowchart diagram of another example method of obtaining a token in accordance with at least some embodiments.

Referring now to FIG. 5, there is illustrated a flowchart diagram of an example method of obtaining a token in accordance with at least some embodiments. Method 500 may be carried out, e.g., by a processor of a tokenization server 130 and a batch computer 140 of FIG. 1 and clarifies how the batch computer and tokenization server interact with a key-value database. The acts of the batch computer are shown arranged beneath the "BATCH" heading; the acts of the key-value database are shown arranged vertically beneath the "KEY-VALUE DATABASE" heading; and the acts of the tokenization server are shown arranged vertically beneath the "TOKENIZATION SERVER" heading.

A batch computer carries out sub-process 501*a*, which is generally analogous to method 300 and in which like numbered elements correspond to analogous acts. For example, act 505*a* of sub-process 501*a* generally corresponds to act 305 of method 300.

At 520*a* of sub-process 501*a*, the batch computer queries the key-value database using the key generated at 515*a*. At 521*a*, the key-value database searches for a corresponding value and returns a response at 523*a* either providing the value in case of a successful search or otherwise indicating that the search was unsuccessful. At 530*a*, a new value can be generated if needed and, at 535*a*, the batch computer transmits a new key-value entry for appending to the key-value database, and the key-value database stores the new entry at 527*a*. The batch computer can then return the token for use as needed at 540*a*.

A tokenization server carries out sub-process 501*b*, which is generally analogous to method 300 and in which like numbered elements correspond to analogous acts. For example, act 505*b* of sub-process 501*b* generally corresponds to act 305 of method 300.

At 520*b* of sub-process 501*b*, the batch computer queries the key-value database using the key generated at 515*b*, which is identical to the key generated at 515*a*. At 521*b*, the key-value database searches for a corresponding value and, since the key-value entry is expected to exist from 535*a* or from a pre-existing entry, returns a successful response at 523*b*. At 525*b*, the token search is determined to be successful and, at the tokenization server can then return the token for use as needed at 540*a*.

Figure 6:
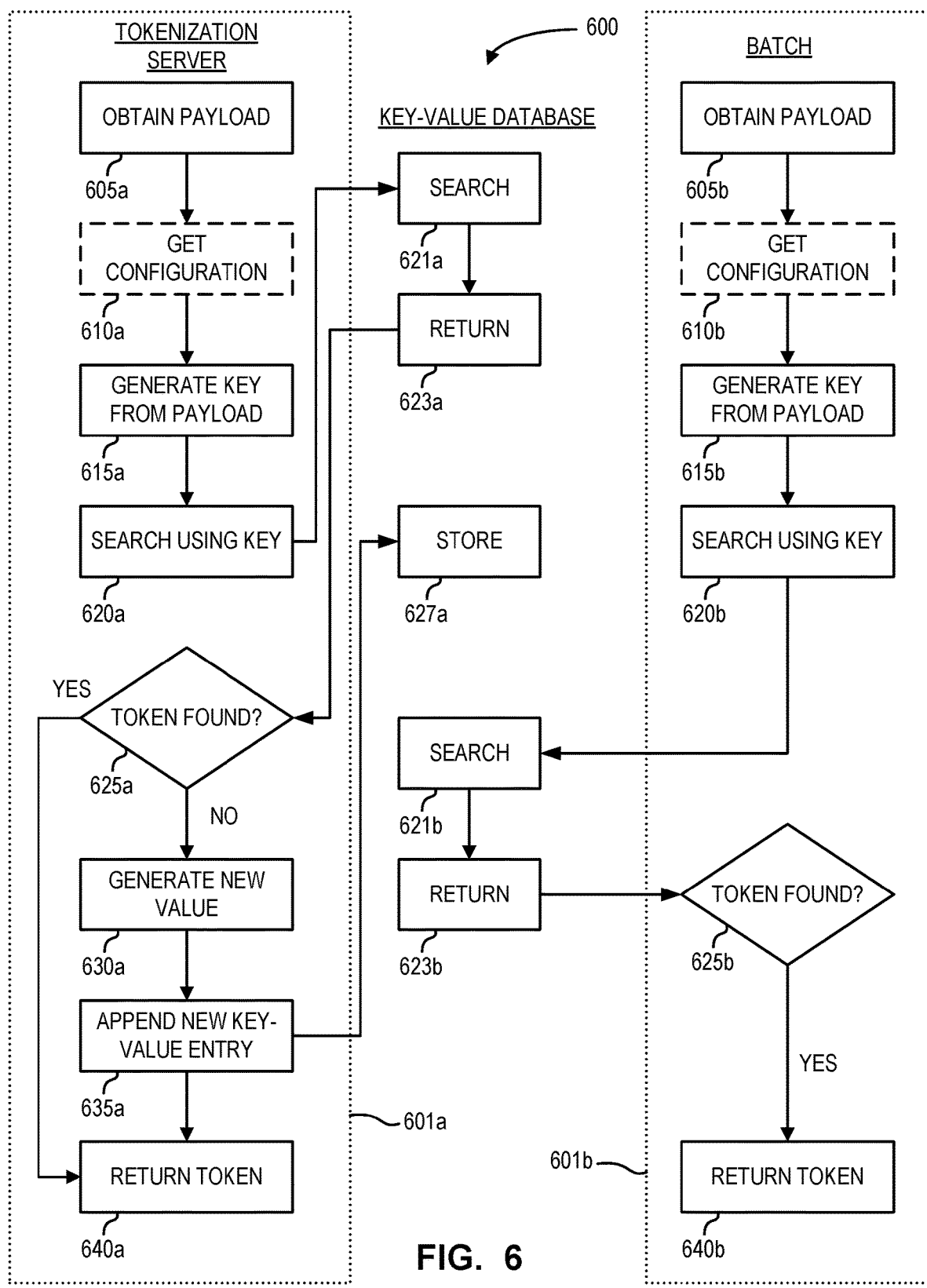
FIG. 6 is a flowchart diagram of another example method of obtaining a token in accordance with at least some embodiments.

Referring now to FIG. 6, there is illustrated a flowchart diagram of an example method of obtaining a token in accordance with at least some embodiments. Method 600 differs from method 500 FIG. 5 primarily in the order in which the batch computer and tokenization server first create a new key-value entry, and also may be carried out, e.g., by a processor of a tokenization server 130 and a batch computer 140 of FIG. 1, interacting with a key-value database. The acts of the batch computer are shown arranged beneath the "BATCH" heading; the acts of the key-value database are shown arranged vertically beneath the "KEY-VALUE DATABASE" heading; and the acts of the tokenization server are shown arranged vertically beneath the "TOKENIZATION SERVER" heading.

A tokenization server carries out sub-process 601*a*, which is generally analogous to method 300 and in which like numbered elements correspond to analogous acts. For example, act 605*a* of sub-process 601*a* generally corresponds to act 305 of method 300.

At 620*a* of sub-process 601*a*, the tokenization server queries the key-value database using the key generated at 615*a*. At 621*a*, the key-value database searches for a corresponding value and returns a response at 623*a* either providing the value in case of a successful search or otherwise indicating that the search was unsuccessful. At 630*a*, a new value can be generated if needed and, at 635*a*, the tokenization server transmits a new key-value entry for appending to the key-value database, and the key-value database stores the new entry at 627*a*. The tokenization server can then return the token for use as needed at 640*b*.

A batch computer carries out sub-process 601*b*, which is generally analogous to method 300 and in which like numbered elements correspond to analogous acts. For example, act 605*b* of sub-process 601*b* generally corresponds to act 305 of method 300.

At 620*b* of sub-process 601*b*, the batch computer queries the key-value database using the key generated at 615*b*, which is identical to the key generated at 615*a*. At 621*b*, the key-value database searches for a corresponding value and, since the key-value entry is expected to exist from 635*a* or from a pre-existing entry, returns a successful response at 623*b*. At 625*b*, the token search is determined to be successful and, at the tokenization server can then return the token for use as needed at 640*b*.

Another aspect of the provided systems and methods in the enablement of machine learning (ML) models to be trained, and used, with consistent tokenized data. Specifically, training may be conducted using data tokenized by a tokenization server (or by a batch computer). Once the ML model is trained on tokenized data, input data to the trained model can also be tokenized using the tokenization server, allowing the model to operate on native tokenized information and thereby improving accuracy and consistency. Once the output of the ML model is generated, a requesting application can de-tokenize the output predictions by substituting the original payload for the token prior to display to a requesting user.

In one example of this approach, a machine learning system may be trained to predict a risk of a future event based on historical data. The historical data is exported from a source data set via the tokenization server, with any PII (e.g., names, postal codes, etc.) tokenized in the process. The model is then trained on the tokenized historical data.

Subsequently, a risk assessment application may be provided to a user. The user may input known information about the nature of the risk. The risk assessment application converts sensitive data elements to tokenized data, and the tokenized data is input to the trained model. The trained model outputs its prediction. If the prediction includes any tokenized data, the tokenized data can be detokenized prior to display to the user.

Figure 7:
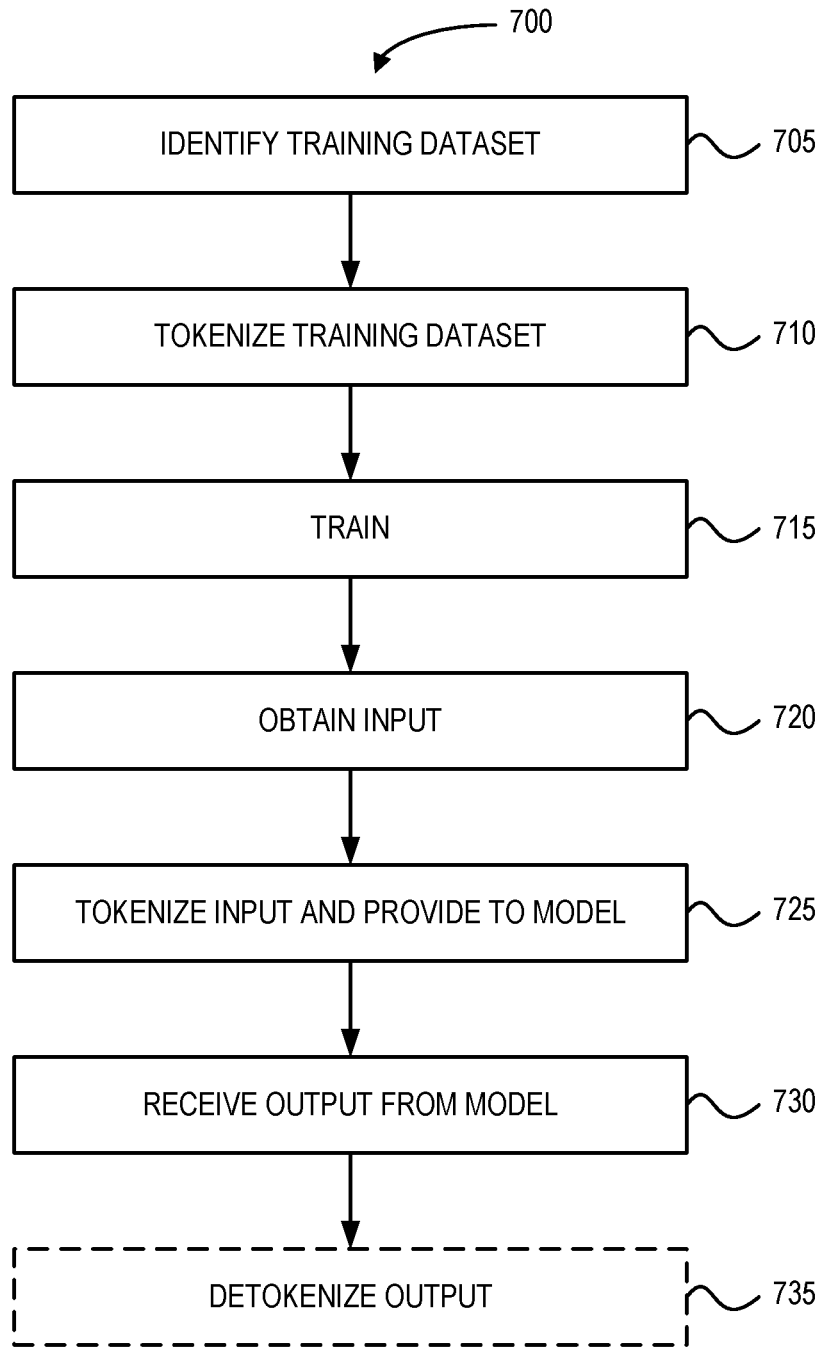
FIG. 7 is a flowchart diagram of an example method of training and using a machine learning model in accordance with at least some embodiments.

Referring now to FIG. 7, there is illustrated a flowchart diagram of an example method of training and using a machine learning model in accordance with at least some embodiments. Method 700 may be carried out, for example, by an application server such as an application server 110 of FIG. 1.

Method 705 begins at 705 with identifying a training data set to be used in training a machine learning model, e.g., a predictive model used to generate predictions from input data.

At 710, sensitive data elements in the training data set are tokenized to generate a tokenized training data set according to the at least one of the methods described herein, such as method 300 or method 400.

At 715, the machine learning model is trained using the tokenized training data set.

At 720, an input to the predictive model is received, e.g., from an end user of a predictive application. At 725, the predictive application transmits the input to a tokenization server, which tokenizes the input using, e.g., method 400 to produce tokenized input.

At 730, a machine learning system, such as application server 110, executes the predictive model upon the tokenized input to produce a prediction that may be transmitted to the predictive application.

Optionally, at 735, the tokenized prediction is de-tokenized using, e.g., method 800, to generate a de-tokenized prediction.

The described embodiments enable a multiplicity of tokenized data sets, with the tokenized data sets exported from the same source data set and being cross-correlatable. For example, the source data set may be a data lake or source database that is rated to contain PII and secured accordingly. Access to such a source data set may be severely restricted and, moreover, the source data set may be hosted on systems that are not capable of servicing real-time requests from a wide variety of sources. The described embodiments enable tokenized data to be exported from the source database via the tokenization API to be hosted in a well-resourced cloud computing system. Sensitive information such as PII is thereby removed from the tokenized data. However, the exported data sets can still be correlated where desired, since tokens corresponding to the same payload will be consistent across all exported data sets.

Figure 8:
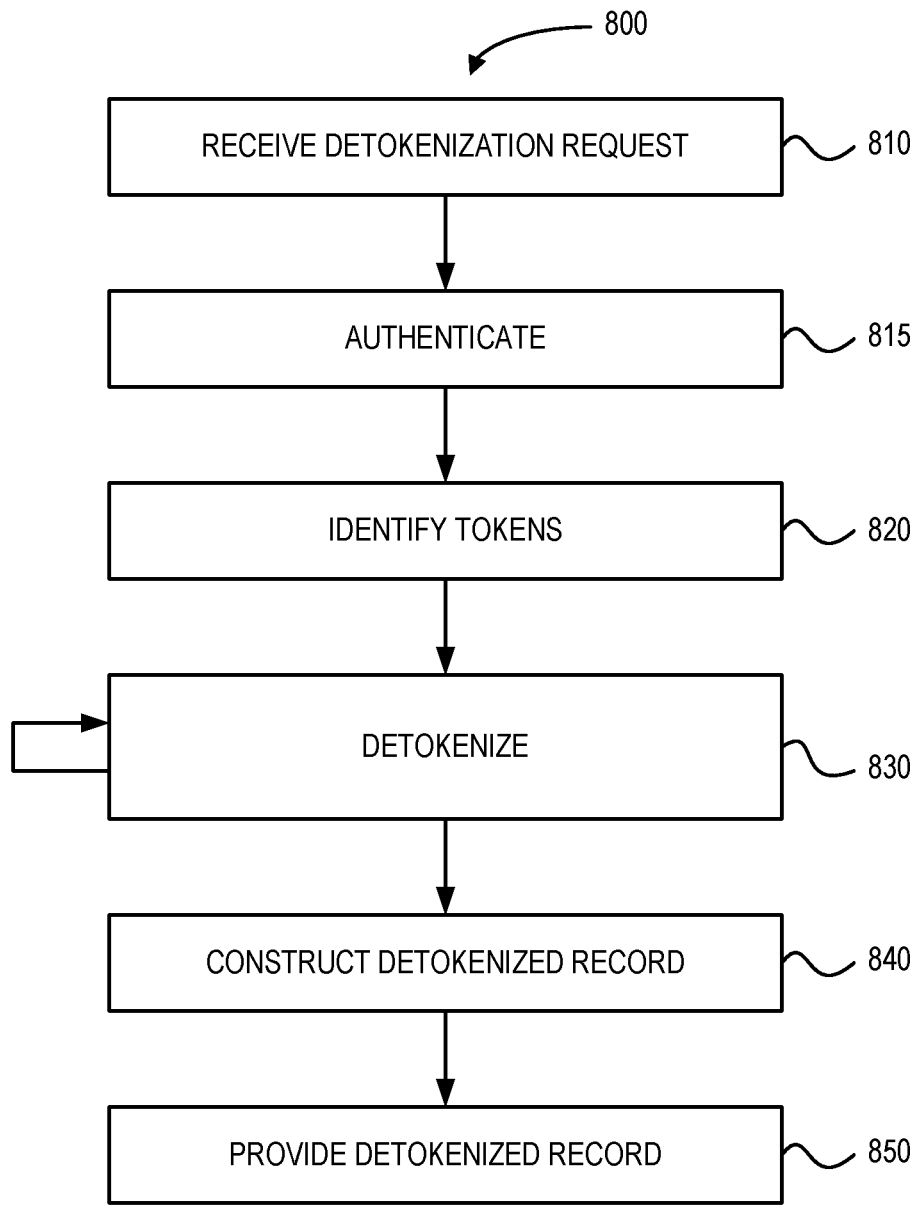
FIG. 8 is a flowchart diagram of an example method of de-tokenizing data in accordance with at least some embodiments.

Referring now to FIG. 8, there is illustrated a flowchart diagram of an example method of de-tokenizing data in accordance with at least some embodiments. Method 800 may be carried out, for example, by a tokenization server such as tokenization server 130 of FIG. 1.

As described herein, the described tokenization server may serve as an API endpoint, and provide a tokenization and detokenization service to one or more application servers. The tokenization server may be, e.g., a web server, such as an Apache Tomcat servlet, configured to respond to API requests received using the Hypertext Transfer Protocol (HTTP) or Hypertext Transfer Protocol Secure (HTTPS).

Method 800 begins at 810, with the tokenization server receiving an HTTP or HTTPS request that forms a detokenization request.

In some embodiments, the detokenization request contains tokenized records to be stored in a source database, such as source database 160. However, in many cases, the detokenized data—and any sensitive data elements therein—will not be revealed outside a secure environment.

The detokenization request contains authentication credentials for detokenizing and writing the detokenized records to the source database. Accordingly, at 815, the tokenization server verifies the authentication credentials.

At 820, the tokenization server identifies the tokens in the tokenized records that are to be detokenized.

At 830, the tokenization server queries the key-value database for each payload corresponding to the token.

At 840, the tokenization server constructs the detokenized record with the payloads, i.e., sensitive data elements, in place of the respective tokens.

At 850, the tokenization server provides the detokenized record, for example by submitting the detokenized record to the source database, where it may be updated or added to the source database. Alternatively, in some embodiments, the detokenized data may be used for other purposes.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g. 112a, or 112l). All elements with a common base number may be referred to collectively or generically using the base number without a suffix (e.g. 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g. a pushbutton keyboard, mouse, a touchscreen, and the like), and at least one output device (e.g. a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A system for tokenizing data, the system comprising:
a key-value database configured to store a mapping;
an application server, the application server comprising an application processor and application memory, the application processor configured to execute: a requesting application to send an unscheduled tokenization request, and a predictive model to obtain a prediction based on a tokenization response to the unscheduled tokenization request, wherein the predictive model is pre-trained using a machine learning training dataset;
a batch processing computer operatively coupled to the key-value database, the batch processing computer comprising a memory and a processor configured to perform a set of batch operations as part of a scheduled batch to produce a batch output, the batch output comprising the machine learning training dataset for pre-training the predictive model, wherein the set of batch operations comprises:
obtaining a payload to be tokenized as part of the scheduled batch and metadata associated with the payload;
identifying a data type of the payload from the metadata associated with the payload; and
processing the payload as part of the scheduled batch to generate a key having a standard format based on the data type of the payload;
locking the key-value database for access by the batch processing computer;
while the key-value database is locked, conducting a search, as part of the scheduled batch, within the key-value database for a value corresponding to the key;
returning the value as the token in the batch output when the search is successful and otherwise:
generating, as part of the scheduled batch, a new value based on the payload, the new value generated based on a universally unique identifier;
appending, as part of the scheduled batch, an entry to the key-value database, where the entry comprises the key and the new value; and
returning the new value as the token in the batch output; and
in response to returning the token in the batch output, unlocking the key-value database; and
an on-demand tokenization server operatively coupled to the key-value database, the on-demand tokenization server comprising a tokenization server memory and a tokenization server processor, the tokenization server processor configured to:
receive the unscheduled tokenization request from the requesting application during a period in which the key-value database is locked by the batch processing computer, the unscheduled tokenization request comprising a second payload to be tokenized for input to the predictive model to obtain the prediction and metadata associated with the second payload;
identify a data type of the second payload from the metadata associated with the second payload;
process the second payload, individually and in real-time in response to the unscheduled tokenization request, to generate a second key having a standard format based on the data type of the second payload, the second key identical to the key;
conduct a search within the key-value database for the value corresponding to the key and the second key; and
respond to the unscheduled tokenization request individually with the tokenization response comprising the value as the token.

2. The system of claim 1, wherein the on-demand tokenization server provides an API service to receive the unscheduled tokenization request.

3. The system of claim 1, wherein the new value has a length similar to a length of the payload.

4. The system of claim 1, wherein:
the unscheduled tokenization request comprises input data; and
the on-demand tokenization server processor is further configured to identify sensitive data amongst the input data as the second payload.

5. The system of claim 4, further comprising a source database, and wherein the on-demand tokenization server is further configured to store the second payload in the source database.

6. The system of claim 5, further comprising:
a tokenized database storing tokenized data, the tokenized data including the token; and
a client computer operatively coupled to the tokenized database and restricted from accessing the source database, the client computer configured to generate a record request identifying the token,
wherein the on-demand tokenization server is further configured to retrieve a record from the source database based on the record request, create a tokenized record in which the token is substituted for the payload, and provide the tokenized record to the client computer.

7. The system of claim 4, wherein:
the unscheduled tokenization request comprises authentication credentials; and
the identification of sensitive data amongst the input data as the second payload is based on the authentication credentials.

8. The system of claim 1, wherein the processor is further configured to identify a configuration file based on the data type, and wherein the processing the payload is performed according to the configuration file.

9. The system of claim 1, wherein the processing the payload to generate a key comprises, in response to determining that the data type comprises a numerical value, trimming the payload to a predetermined number of significant digits or rounding the numerical value in the payload to a predetermined order of magnitude to provide the key.

10. The system of claim 1, wherein the processing the payload to generate a key comprises, in response to determining that the data type comprises alphabetic characters, substituting lowercase letters of the alphabetic characters in the payload with lowercase letters in the key.

11. The system of claim 1, wherein the processing the payload to generate a key comprises in response to determining that the data type comprises a telephone number, removing special characters amongst the telephone number in the payload to provide the key.

12. The system of claim 1, wherein the processing the payload to generate a key comprises in response to determining that the data type comprises an address, identifying a standardized postal code from a postal code database based on a street address in the payload, and using the standardized postal code in the key.

13. A method of obtaining a token, the method comprising:
- obtaining, at a batch processing computer and in the context of a set of batch operations as part of a scheduled batch to produce a batch output, the batch output comprising a machine learning training dataset for training a predictive model, a payload to be tokenized as part of the scheduled batch and metadata associated with the payload;
- identifying a data type of the payload from the metadata associated with the payload;
- processing, by the batch processing computer as part of the scheduled batch, the payload to generate a key having a standard format based on the data type of the payload;
- locking the key-value database for access by the batch processing computer;
- while the key-value database is locked, conducting a search, as part of the scheduled batch, within a key-value database for a value corresponding to the key;
- returning the value as the token in the batch output when the search is successful and otherwise:
  - generating, as part of the scheduled batch, a new value based on the payload, the new value generated based on a universally unique identifier;
  - appending, as part of the scheduled batch, an entry to the key-value database, where the entry comprises the key and the new value; and
  - returning the new value as the token in the batch output;
- in response to returning the token in the batch output, unlocking the key-value database;
- training, at an application server, the predictive model using the machine learning training dataset;
- executing, at the application server, a requesting application to send an unscheduled tokenization request;
- receiving, at an on-demand tokenization server, the unscheduled tokenization request from the requesting application during a period in which the key-value database is locked by the batch processing computer, the unscheduled tokenization request comprising a second payload to be tokenized for input to the predictive model trained with the machine learning training dataset to obtain a prediction and metadata associated with the second payload, wherein the on-demand tokenization server is operatively coupled to the key-value database;
- identifying a data type of the second payload from the metadata associated with the second payload;
- processing the second payload, individually and in real-time in response to the unscheduled tokenization request, to generate a second key having a standard format based on the data type of the second payload, the second key identical to the key;
- conducting a search within the key-value database for the value corresponding to the key and the second key;
- responding to the unscheduled tokenization request individually with a tokenization response comprising the value as the token; and
- executing, at the application server, the predictive model to obtain a prediction based on the tokenization response to the unscheduled tokenization request.

14. The method of claim 13, further comprising, prior to processing the payload to generate the key, identifying a configuration file based on the data type, wherein the processing the payload is performed according to the configuration file.

15. The method of claim 13, wherein the on-demand tokenization server provides an API service to receive the unscheduled tokenization request.

16. The method of claim 13, further comprising:
- the on-demand tokenization server receiving a second unscheduled tokenization request from another requesting application during the period in which the key-value database is locked by the batch processing computer, the second unscheduled tokenization request comprising a third payload to be tokenized for input to a second predictive model trained with a second machine learning training dataset to obtain a second prediction and metadata associated with the third payload, the second machine learning training dataset comprising the token;
- the on-demand tokenization server identifying a data type of the third payload from the metadata associated with the third payload;
- the on-demand tokenization server processing the third payload to generate a third key having a standard format based on the data type of the third payload, the third key identical to the key;
- the on-demand tokenization server conducting a search within the key-value database for the value corresponding to the key and the third key; and
- the on-demand tokenization server responding to the second unscheduled tokenization request with a second tokenization response comprising the value as the token.

17. The method of claim 13, wherein the new value has a length similar to a length of the payload.

18. The method of claim 13, wherein:
- the unscheduled tokenization request comprises input data; and
- the method comprises identifying, by the on-demand tokenization server, sensitive data amongst the input data as the second payload.

19. The method of claim 18, wherein:
- the unscheduled tokenization request comprises authentication credentials; and
- the identification of sensitive data amongst the input data as the second payload is based on the authentication credentials.

20. A non-transitory computer readable medium storing computer executable instructions which, when executed by at least one computer processor, cause the at least one computer processor to carry out a method of obtaining a token, the method comprising:
- obtaining, at a batch processing computer and in the context of a set of batch operations as part of a scheduled batch to produce a batch output, the batch output comprising a machine learning training dataset for training a predictive model, a payload to be tokenized as part of the scheduled batch and metadata associated with the payload;
- identifying a data type of the payload from the metadata associated with the payload;
- processing, by the batch processing computer as part of the scheduled batch, the payload to generate a key having a standard format based on the data type;
- locking the key-value database for access by the batch processing computer;
- while the key-value database is locked, conducting a search, as part of the scheduled batch, within a key-value database for a value corresponding to the key;
- returning the value as the token in the batch output when the search is successful and otherwise:

generating, as part of the scheduled batch, a new value based on the payload, the new value generated based on a universally unique identifier;
appending, as part of the scheduled batch, an entry to the key-value database, where the entry comprises the key and the new value; and
returning the new value as the token in the batch output;
in response to returning the token in the batch output, unlocking the key-value database;
training, at an application server, the predictive model using the machine learning training dataset;
executing, at the application server, a requesting application to send an unscheduled tokenization request;
receiving, at an on-demand tokenization server, the unscheduled tokenization request from a requesting application during a period in which the key-value database is locked by the batch processing computer, the unscheduled tokenization request comprising a second payload to be tokenized for input to the predictive model trained with the machine learning training dataset to obtain a prediction and metadata associated with the second payload, wherein the on-demand tokenization server is operatively coupled to the key-value database;
identifying a data type of the second payload from the metadata associated with the second payload;
processing the second payload, individually and in real-time in response to the unscheduled tokenization request, to generate a second key having a standard format based on the data type of the second payload, the second key identical to the key;
conducting a search within the key-value database for the value corresponding to the key and the second key;
responding to the unscheduled tokenization request individually with a tokenization response comprising the value as the token; and
executing, at the application server, the predictive model to obtain a prediction based on the tokenization response to the unscheduled tokenization request.

* * * * *